(12) United States Patent
Melz et al.

(10) Patent No.: US 7,905,517 B2
(45) Date of Patent: Mar. 15, 2011

(54) DEVICE FOR INCREASING OCCUPANT PROTECTION IN A MOTOR VEHICLE DURING A LATERAL IMPACT

(75) Inventors: Tobias Melz, Darmstadt (DE); Björn Seipel, Florstadt (DE); Bernhard Sielhorst, Rheda-Wiedenbrück (DE); Eric Zimmerman, Kassel (DE)

(73) Assignees: Fraunhofer-Gesellschaft zur Förderung der Angewandten Forschung E.V., Munich (DE); Faurecia Innenraum Systeme GmbH, Hagenback (DE)

( * ) Notice: Subject to any disclaimer, the term of this patent is extended or adjusted under 35 U.S.C. 154(b) by 194 days.

(21) Appl. No.: 11/914,822

(22) PCT Filed: May 12, 2006

(86) PCT No.: PCT/EP2006/004501
§ 371 (c)(1),
(2), (4) Date: Feb. 19, 2009

(87) PCT Pub. No.: WO2006/122725
PCT Pub. Date: Nov. 23, 2006

(65) Prior Publication Data
US 2009/0218794 A1    Sep. 3, 2009

(30) Foreign Application Priority Data

May 19, 2005  (DE) .................... 10 2005 023 073
Aug. 30, 2005 (DE) .................... 10 2005 041 079

(51) Int. Cl.
*B60R 21/04* (2006.01)

(52) U.S. Cl. ............... 280/753; 280/730.2; 296/187.05; 188/372

(58) Field of Classification Search ............ 280/730.2, 280/730.1, 753, 751; 296/187.05; 188/372
See application file for complete search history.

(56) References Cited

U.S. PATENT DOCUMENTS

| | | | |
|---|---|---|---|
| 6,152,488 A * | 11/2000 | Hedderly et al. | 280/775 |
| 6,170,871 B1 * | 1/2001 | Goestenkors et al. | 280/743.1 |
| 6,299,209 B1 * | 10/2001 | Ankersson et al. | 280/753 |
| 6,338,501 B1 * | 1/2002 | Heilig et al. | 280/753 |
| 6,786,508 B2 * | 9/2004 | Fraley et al. | 280/751 |
| 6,910,714 B2 * | 6/2005 | Browne et al. | 280/753 |
| 7,055,853 B2 * | 6/2006 | Honda et al. | 280/730.2 |
| 7,140,478 B2 * | 11/2006 | Barvosa-Carter et al. | 188/267 |

(Continued)

FOREIGN PATENT DOCUMENTS

| | | |
|---|---|---|
| DE | 41 25 299 A1 | 2/1993 |
| DE | 195 97 988 C2 | 2/1997 |
| DE | 198 28 444 A1 | 12/1999 |

(Continued)

*Primary Examiner* — Faye M. Fleming
*Assistant Examiner* — Drew Brown
(74) *Attorney, Agent, or Firm* — Antonelli, Terry, Stout & Kraus, LLP.

(57) ABSTRACT

The invention is a device for increasing occupant protection in a motor vehicle during a lateral impact, in which the energy input acts laterally on a partial area of the motor vehicle door wherein a motor vehicle seat is situated on the side of the motor vehicle door facing away from the energy input. The motor vehicle door is provided with an interior lining facing the motor vehicle seat and at least one partial area of the interior door lining is conveyable from an initial state into an extended state projecting by a drive unit into the motor vehicle interior. The drive unit is connected to the motor vehicle door and to the partial area of the interior door lining.

41 Claims, 2 Drawing Sheets

U.S. PATENT DOCUMENTS

| | | | |
|---|---|---|---|
| 7,264,271 B2 * | 9/2007 | Barvosa-Carter et al. | 280/751 |
| 7,267,367 B2 * | 9/2007 | Barvosa-Carter et al. | 280/753 |
| 7,392,876 B2 * | 7/2008 | Browne et al. | 180/274 |
| 2004/0061321 A1 | 4/2004 | Fraley et al. | |
| 2004/0195815 A1 * | 10/2004 | Browne et al. | 280/753 |
| 2007/0102908 A1 * | 5/2007 | Schuler et al. | 280/732 |
| 2008/0191454 A1 * | 8/2008 | Barvosa-Carter et al. | 280/739 |

FOREIGN PATENT DOCUMENTS

| | | |
|---|---|---|
| DE | 100 43 290 C1 | 4/2002 |
| DE | 103 41 329 A1 | 4/2005 |
| DE | 103 51 752 A1 | 6/2005 |
| JP | 2001206176 | 7/2001 |
| WO | WO 2005/025945 A1 | 3/2005 |

* cited by examiner

/// areas which can swing out

DEVICE FOR INCREASING OCCUPANT PROTECTION IN A MOTOR VEHICLE DURING A LATERAL IMPACT

BACKGROUND OF THE INVENTION

1. Field of the Invention

The present invention relates to a device for increasing occupant protection in a motor vehicle during a lateral impact, in which the energy input acts laterally on a door region of the motor vehicle, with a motor vehicle seat being situated on the side of the motor vehicle door facing away from the energy input wherein the motor vehicle door is provided with interior door lining facing the motor vehicle seat.

2. Description of the Prior Art

Motor vehicle accidents in which uncontrolled, collision-based energy input acts by way of lateral impact on a motor vehicle door usually result in considerable injury to the occupants of the motor vehicle wherein in particular the occupants situated closest to the motor vehicle door are exposed to the lateral impact. The reason for this is the limited deformation path available for the energy of the crash acting on the motor vehicle door and the relatively limited energy absorption capacity of the lateral structure of a motor vehicle.

For reducing the risk of injury in lateral impact scenarios, there are numerous state-of-the-art proposals to increase the rigidity of the motor vehicle door in transverse direction of the vehicle with the aid of lateral-impact beam systems for stabilizing the motor vehicle door, such as described in DE AS 22 15 674, DE 41 25 299 C2 and DE 198 28 444 A1.

Representative of such systems with lateral impact protection reference is made to DE 103 41 329 A1, which describes a lateral impact protection system whose lateral impact beam running through the motor vehicle door is activatable by the energy input stemming from the collision independent of the form of energy. The lateral impact beam enters an active connection with the chassis areas surrounding the motor vehicle door. A transducer material is used to activate the lateral impact beam which permits the operation of the lateral impact beam to be reversible and, in particular, to activate the lateral impact beam at selected times.

Although development of the prior-art lateral impact protection systems permits better absorption of the crash-energy input directed at the motor vehicle door better and to convey the crash energy to more rigid areas of the chassis, these lateral impact protection systems are nonetheless unable to protect against uncontrolled crash-produced inherent movements of a person sitting on a motor vehicle seat. Rather airbag systems are employed, which pop open inside the motor vehicle interior following a collision and act as an impact cushion for the person. In particular, airbag systems integrated in and along the interior lining of the door offer resilient buffering protection between the interior door lining and the person situated on the motor vehicle seat. Airbag systems, however, can only be used in an as such known manner once and possess resilient buffering protective properties only if they are maximumly full.

A proposal is described in the subsequently published DE 103 51 752 A1, whose date of disclosure is after the priority date claimed of the filing of the present invention goes one step further regarding reducing the danger of injury for motor vehicle occupants in lateral impact accidents. In this case the protection system provides at least one cushion element which is disposed laterally on the motor vehicle adjacent to the occupant position and is movable from a rest state into an extended state in the direction of the occupant position by an activation device. The activation device is driven by a vehicle drive. Extrusion of the cushion element occurs with an electric motor using a spring memory or by a pyrotechnical element.

SUMMARY OF THE INVENTION

The present invention is a device for increasing occupant protection in a motor vehicle during a lateral impact in which the energy input acts laterally on a door region of the motor vehicle wherein a motor vehicle seat is situated on the side of the motor vehicle door facing away from the energy input and the motor vehicle door side is provided with an interior door lining facing the motor vehicle seat. Protection of a person situated on the motor vehicle seat against uncontrolled impact is improved from the motor vehicle door exposed to the collision-based energy input. Moreover, it is preferable, the device should be used reversibly.

According to the device of the invention for increasing occupant protection in a motor vehicle during a lateral impact in which energy input acts laterally on a door region of the motor vehicle with a motor vehicle seat located on the side of the motor vehicle door facing away from the energy input, an interior door lining facing the motor vehicle seat is provided and at least one partial area of the interior door lining is conveyed, by a drive unit connected to the motor vehicle door. The partial area is conveyed from an initial state into an extended state projecting into the motor vehicle interior by drive unit having a transducer material activatable by energy input.

The device according to the invention is based on filling the intermediate space between a person sitting on the motor vehicle seat and the interior door lining as completely as possible so that the dynamic behavior of the person in a crash situation can be influenced. In a lateral impact situation, after inherent body inertness has been overcome, the moment of force acting on the motor vehicle first accelerates the person in the direction of the flow of the collision-based force by the force triggering a motion which the seat-belt system abruptly stops and, due to the inherent elasticity of the protection system as well as the inherent elasticity of the person's body, the motion is transformed into a reverse movement in the direction of the motor vehicle door exposed to the energy flow of the lateral impact. The person experiences extreme changing moments of force especially in the head/neck region, which possesses high injury potential. However, a person usually suffers life threatening injuries if he/she hits the side of the motor vehicle door facing the interior of the motor vehicle. The door is deformed toward the interior of the motor vehicle as a result of the collision. The device of the invention decisively reduces the life threatening injury potential associated with the person hitting the interior wall of the motor vehicle door in that the reverse motion directed in the opposite direction of the collision-based force input described above is suppressed as much as possible and in particular gently decelerated by using a transducer material according to the invention. A prerequisite for this is actively minimizing the free intermediate space between the person and the interior lining of the motor vehicle door by a transducer-material-based drive element.

For this purpose, the interior door lining is provided with at least one partial area which is extended in a rotary manner or a translating manner from the interior-door-lining plane to minimize the space between it and the person by preferably slightly touching the person laterally. If the person presses on the extended partial area of the interior door lining due to the dynamic behavior stemming from the collision, the partial area is preferably returned to its initial position. Returning to the initial position is dampened and decelerated by using suitable dampening elements or damper. Suitable preferred dampening units or dampers are basically any type of elastic molding body, such as foam rubber cushions, elastomers, etc. Especially suited, however, are transducer materials, for example shape-memory alloys or electrorheological liquids, just to name a few, whose dampening properties are adjustable by corresponding activation by way of controlled electric energy input. Energy dissipation takes place inside the dampening unit or damper designed in this manner due to which the biomechanical stress acting on the person can be reduced considerably. Thus designing the dampening unit or damper according to the invention using a transducer material permits selected extension of a partial area of the interior door lining and at the same time also acts as a dampening unit. In this manner, the drive unit and the dampening unit are combined in a single unit making a small, light-weight unit realizable, as the automobile industry desires.

A preferred combination of the protection system according to the invention with a vehicle sensor system which is able to detect an imminent, unavoidable lateral impact permits timely activation of the drive unit and controlled extension related thereto of at least one partial area of the interior door lining even before the crash energy acts on the vehicle. In this manner, the space between the interior door lining and the person is reduced to a minimum. Even the additional distance to the motor vehicle door due to the reaction time and the elasticity of the seat-belt system can be minimized by a corresponding follow-up of the partial area. In this way, a situation is created in which the person, on the one hand, is buffered by the seat-belt system and, on the other hand, by the at least one extended partial area of the interior door lining.

In an especially preferred embodiment, two independent (decoupled from each other) partial areas of the interior door lining are conveyed into an extended state with one partial area laterally contacting the pelvis region from one side and the other partial area contacting the torso region of the person situated on the motor vehicle seat. Both partial areas are returned to their respective initial positions by the dampening units allocated to them with the same dampening characteristics or varying dampening characteristics adapted to the respective biomechanical stress limits of the corresponding parts of the body by the person's inherent dynamics in such a manner that the person experiences for the most part gentle cushioning.

Of course, more than two partial areas or even the entire interior door lining can be used in a suitable manner to cushion the person according to the invention.

The described embodiment for selected reduction of the life-threatening injury potential to which the occupants of a motor vehicle are exposed in the event of a lateral impact is based on the principle of at least one region of an intermediate space between the person sitting on the motor vehicle seat and the interior lining of the door being minimized by the extension of at least one partial area of the interior lining of the door in the direction of the interior of the motor vehicle. Furthermore, the at least one partial area of the interior lining of the door decelerates the person in a dampening manner during or following the collision-based energy input stemming from the collision-based relative acceleration in the direction of the interior lining of the door. Extension of the at least one partial area of the interior door lining in the direction of the interior of the motor vehicle occurs before the collision-based energy input with the aid of state-of-the-art pre-crash sensors which are preferably laterally attached to the motor vehicle and detect an imminent unavoidable-deemed lateral impact situation. In this case, the drive unit required for extension of at least one partial area of the interior door lining is activated. Translating or rotary movements of the at least one partial area have proven to be advantageous. Use according to the invention of transducer materials for extension enables not only extraordinarily quick activation and extension of the partial area but also carrying out the extension in reverse safely. That is mistriggering does not lead to failure of the safety system according to the present invention as is the case with airbag systems in which the airbag has to be completely replaced after activation. The safety system's reversible manner of functioning according to the invention therefore excuses misinterpretations of the sensor-detected imminent situation, thereby permitting use of less reliable and consequently less expensive sensor systems.

BRIEF DESCRIPTION OF THE DRAWINGS

The present invention is made more apparent in the following using preferred embodiments with reference to the drawings by way of example without the intention of limiting the scope or spirit of the invention.

DETAILED DESCRIPTION OF THE INVENTION

Figure 1:
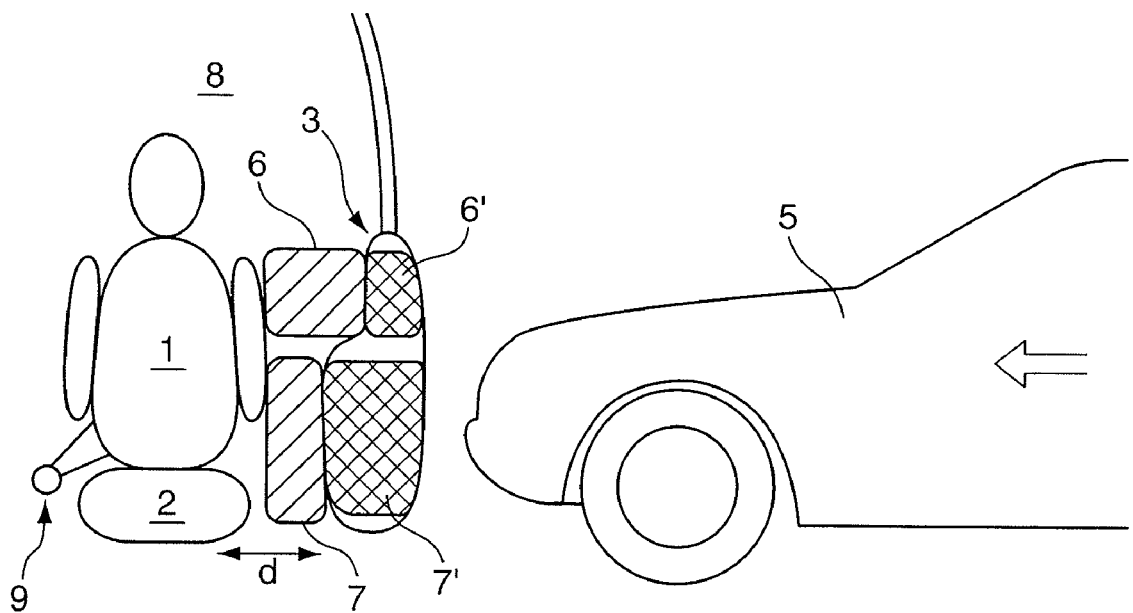
FIG. 1 shows a schematic representation of a typical lateral impact situation.

FIG. 1 shows a schematic of an imminent unavoidable lateral impact. A person 1 sitting inside a motor vehicle on a motor vehicle seat 2 is a distance d from the interior door lining 3 of a motor vehicle door 4. A sensor system (not illustrated) recognizes the unavoidable lateral impact situation in which a vehicle 5 approaches the motor vehicle door 4. In this case, the partial areas 6 and 7 of the interior door lining 3 are extended in the direction of the motor vehicle interior 8 to fill the intermediate space between the person 1 and the interior door lining 3 described by the space d and assumes an extended state toward the person 1.

If a collision occurs between the motor vehicle 5 and the motor vehicle door 4, the person 1 is then first moved back in the direction of the force impact caused by the motor vehicle 5. That is in the described case the person is accelerated to the left and then due to the restraining force of the seat-belt system is returned in the direction of the motor vehicle door 4. However, this return process is dampened and decelerated as the partial areas 6 and 7 connected to the interior door lining 3 are returned to their initial state 6' and 7' (see hatched area). The process of returning to the partial state 6 and 7 occurs with dampening and deceleration. Notably suitable dampening units or dampers, are returned by the transducer materials or foam rubber elements or the like.

Figure 2:
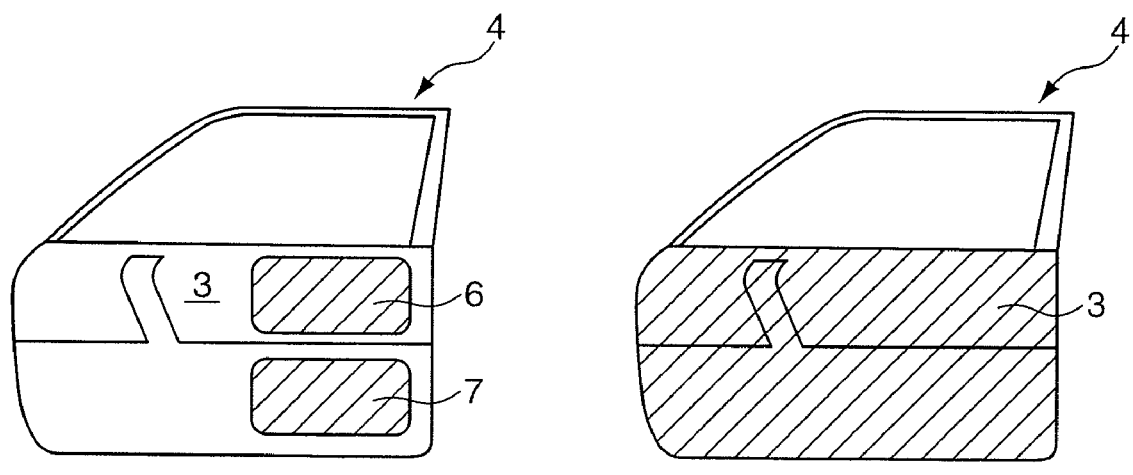
FIGS. 2a and b show a schematic representation of an interior door lining designed according to the invention.

FIG. 2a shows schematically the interior door lining 3 of a motor vehicle door 4 with two plane designed partial areas 6 and 7 which can be conveyed out of the surface of the interior door lining 3 in an extended state in the direction of the motor vehicle interior. The partial area 6 is able to intercept and cushion the torso region and the shoulder region, of a person situated in a motor vehicle seat, whereas the partial area 7 is able to protect the pelvis region of a person. In the preferred embodiment version according to FIG. 2b, the entire interior door lining (see hatching) is conveyable into an extended state projecting into the interior of the motor vehicle.

Figure 3:
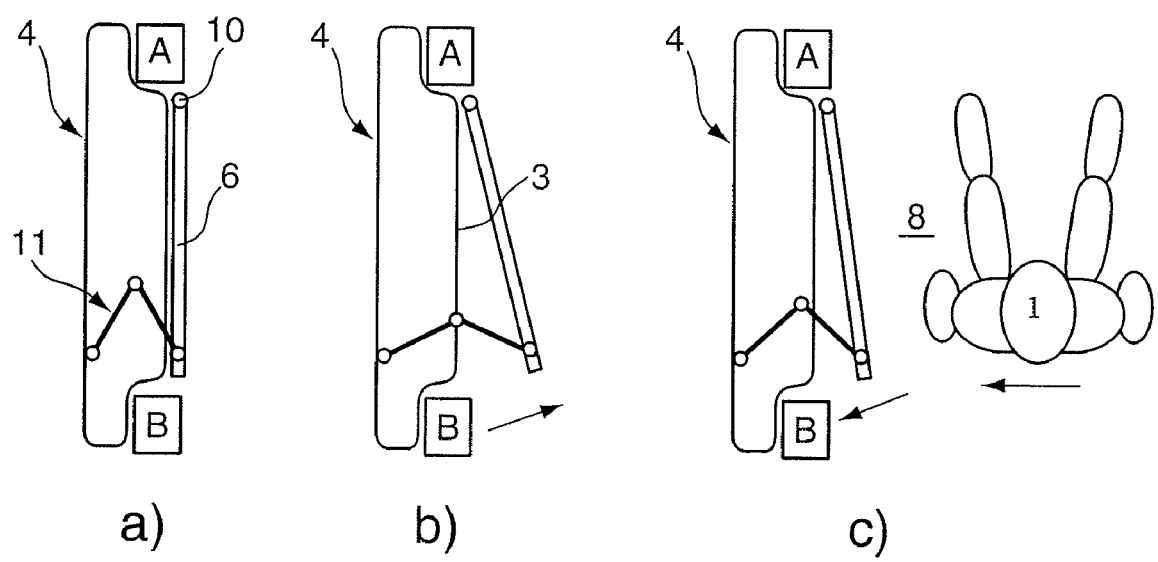
FIGS. 3a, b and c show sequential image representations of the extension of at least one partial area of an interior door lining.

In each instance, extension of a partial area of the interior door lining can occur either translate along a linear axis or according to the representation of FIGS. 3a to 3c rotate about a vertically disposed swiveling axis 10. The sequential pictures shown in FIGS. 3a to 3c correspond to the schematic top views of a right motor vehicle door 4 on the interior side 3 of which is attached a partial area 6 borne in such a manner that it can clap and swing, into the motor vehicle interior 8. The motor vehicle door is locked between the A column and the B column. The partial area 6 is articulated rotatably about the axis 10 with its front side edge region and with its opposite end region connected to the articulation kinematics 11 which are swingable into the motor vehicle interior 8. On the one hand, the articulation kinematics 11 is connected to the freely swingable end of the partial area 6 and, on the other hand, to the motor vehicle door 4. The articulation kinematics 11 serves both as a drive unit to extend the partial area 6 according to FIG. 3b, and to return the extended partial area 6 into the initial state in a dampened manner according to FIG. 3c. The articulation kinematics 11 are designed as a drive unit and a dampening unit which is made of a transducer material or is at least provided with parts comprising a transducer material.

The transducer material may be, for example, in the form of a memory alloy or an electrorheological fluid whose extension is influenceable by energy input, preferably in the form of electric energy. Of course other transducer materials can also be used, for example piezo-ceramics, in particular unleaded piezo-ceramics, piezo-polymers electrostrictive ceramics, electrorheological fluids, polymer gels, magnet rheological fluids, as well as shape-memory polymers. Depending on the transducer material, corresponding actuator designs are required for the successful extension of the respective partial area.

The articulation kinematics 11 comprising at least some parts of transducer materials with an individually adjustable dampening behavior and a prescribed dampening behavior permit returning the extended partial area 6 with individual decelerating characteristics. It is, of course, also possible in addition to combine the articulation kinematics 11 with further dampening units, for example with elastomers or foam rubber cushions, etc.

LIST OF REFERENCES 1 person
2 motor vehicle seat
3 interior door lining
4 motor vehicle door
5 motor vehicle
6, 7 partial areas
8 motor vehicle interior
9 seat-belt system
10 swinging axis
11 articulation kinematics

What is claimed is:

1. A system for increasing occupant protection of an occupant in a motor vehicle during a lateral impact which provides a lateral input of energy against an exterior of a motor vehicle door which is directed toward an interior of the motor vehicle at which the occupant is sitting on a motor vehicle seat adjacent to an interior surface of the motor vehicle door comprising:

an assembly including an area of the interior of the motor vehicle which is part of an interior door surface of the motor vehicle door when the assembly is in an initial state, the area in the initial state being received within the interior door surface before the lateral impact is imminent within an opening of the interior door surface of the motor vehicle door, a drive associated with the area for attachment to the interior of the motor vehicle door including a transducer material which is activated by an energy input for moving the area from the initial state within the opening of the interior door surface toward the occupant to an extended state at which the area is at least partially separated from the opening of the interior door surface to lessen space between the occupant and the area and at least one damper associated with the area or the drive for decelerating movement of the occupant toward the door after the drive has moved the area to the extended state; and wherein the area closest to the occupant does not change shape during movement from the initial state toward the extended state before any contact with the occupant.

2. A system according to claim 1 wherein:
the at least one damper is part of the drive.

3. A system according to claim 1 wherein the at least one damper is part of the area closest to the occupant and comprises a compressible material, a dilatable material or a deflatable material.

4. A system according to claim 3 wherein the compressible material is foam rubber.

5. A system in accordance with claim 1 wherein the drive moves the area linearly from the first state to the extended state.

6. A system in accordance with claim 2 wherein the drive moves the area linearly from the first state to the extended state.

7. A system in accordance with claim 3 wherein the drive moves the area linearly from the first state to the extended state.

8. A system in accordance with claim 4 wherein the drive moves the area linearly from the first state to the extended state.

9. A system according to claim 1 wherein the drive swings the area from the first state to the extended state.

10. A system according to claim 2 wherein the drive swings the area from the first state to the extended state.

11. A system according to claim 3 wherein the drive swings the area from the first state to the extended state.

12. A system according to claim 4 wherein the drive swings the area from the first state to the extended state.

13. A system in accordance with claim 1 wherein the drive is electrically activated.

14. A system in accordance with claim 12 wherein the drive comprises at least one of a piezoelectric material, piezo-ceramics, unleaded piezo-ceramics, piezo-polymers, electrostrictive ceramics, electrorheological fluids, electroactive polymers, polymer gels, magnetorheological fluids, shape-memory alloys and shape-memory polymers.

15. A system in accordance with claim 2 wherein the drive is electrically activated.

16. A system in accordance with claim 15 wherein the drive comprises a piezoelectric material, piezo-ceramics, unleaded piezo-ceramics, piezo-polymers, electrostrictive ceramics, electrorheological fluids, electroactive polymers, polymer gels, magnetorheological fluids, shape-memory alloys and shape-memory polymers.

17. A system in accordance with claim 3 wherein the drive is electrically activated.

18. A system in accordance with claim 17 wherein the drive comprises a piezoelectric material, piezo-ceramics, unleaded piezo-ceramics, piezo-polymers, electrostrictive ceramics, electrorheological fluids, electroactive polymers, polymer gels, magnetorheological fluids, shape-memory alloys and shape-memory polymers.

19. A system in accordance with claim 4 wherein the drive is electrically activated.

20. A system in accordance with claim 19 wherein the drive comprises a piezoelectric material, piezo-ceramics, unleaded piezo-ceramics, piezo-polymers, electrostrictive ceramics, electrorheological fluids, electroactive polymers, polymer gels, magnetorheological fluids, shape-memory alloys and shape-memory polymers.

21. A system in accordance with claim 5 wherein the drive is electrically activated.

22. A system in accordance with claim 21 wherein the drive comprises a piezoelectric material, piezo-ceramics, unleaded piezo-ceramics, piezo-polymers, electrostrictive ceramics, electrorheological fluids, electroactive polymers, polymer gels, magnetorheological fluids, shape-memory alloys and shape-memory polymers.

23. A system in accordance with claim 9 wherein the drive is electrically activated.

24. A system in accordance with claim 23 wherein the drive comprises a piezoelectric material, piezo-ceramics, unleaded piezo-ceramics, piezo-polymers, electrostrictive ceramics, electrorheological fluids, electroactive polymers, polymer gels, magnetorheological fluids, shape-memory alloys and shape-memory polymers.

25. A system according to claim 13 wherein the at least one damper includes control by an electrical signal to control the deceleration.

26. A system according to claim 14 wherein the at least one damper includes control by an electrical signal to control the deceleration.

27. A system according to claim 1 wherein the assembly comprises a first damper which is part of the drive and a second damper which is part of the area.

28. A system according to claim 2 wherein the assembly comprises a first damper which is part of the drive and a second damper which is part of the area.

29. A system according to claim 3 wherein the assembly comprises a first damper which is part of the drive and a second damper which is part of the area.

30. A system according to claim 4 wherein the assembly comprises a first damper which is part of the drive and a second damper which is part of the area.

31. A system according to claim 5 wherein the assembly comprises a first damper which is part of the drive and a second damper which is part of the area.

32. A system according to claim 6 wherein the assembly comprises a first damper which is part of the drive and a second damper which is part of the area.

33. A system according to claim 7 wherein the assembly comprises a first damper which is part of the drive and a second damper which is part of the area.

34. A system according to claim 8 wherein the assembly comprises a first damper which is part of the drive and a second damper which is part of the area.

35. A system according to claim 9 wherein the assembly comprises a first damper which is part of the drive and a second damper which is part of the area.

36. A system according to claim 10 wherein the assembly comprises a first damper which is part of the drive and a second damper which is part of the area.

37. A system according to claim 11 wherein the assembly comprises a first damper which is part of the drive and a second damper which is part of the area.

38. A system according to claim 12 wherein the assembly comprises a first damper which is part of the drive and a second damper which is part of the area.

39. A system according to claim 13 wherein the assembly comprises a first damper which is part of the drive and a second damper which is part of the area.

40. A system according to claim 14 wherein the assembly comprises a first damper which is part of the drive and a second damper which is part of the area.

41. A system according to claim 1 wherein:
the drive returns the area from the extended state to the initial state within the opening of the interior door after the lateral impact.

* * * * *